May 4, 1965 R. D. RUMSEY ET AL 3,181,437
ROTARY ACTUATOR
Filed Nov. 8, 1962 2 Sheets-Sheet 1

INVENTORS
Rollin Douglas Rumsey
Gordon W. Kamman
BY
Hill, Sherman, Meroni, Gross & Simpson
ATTORNEYS

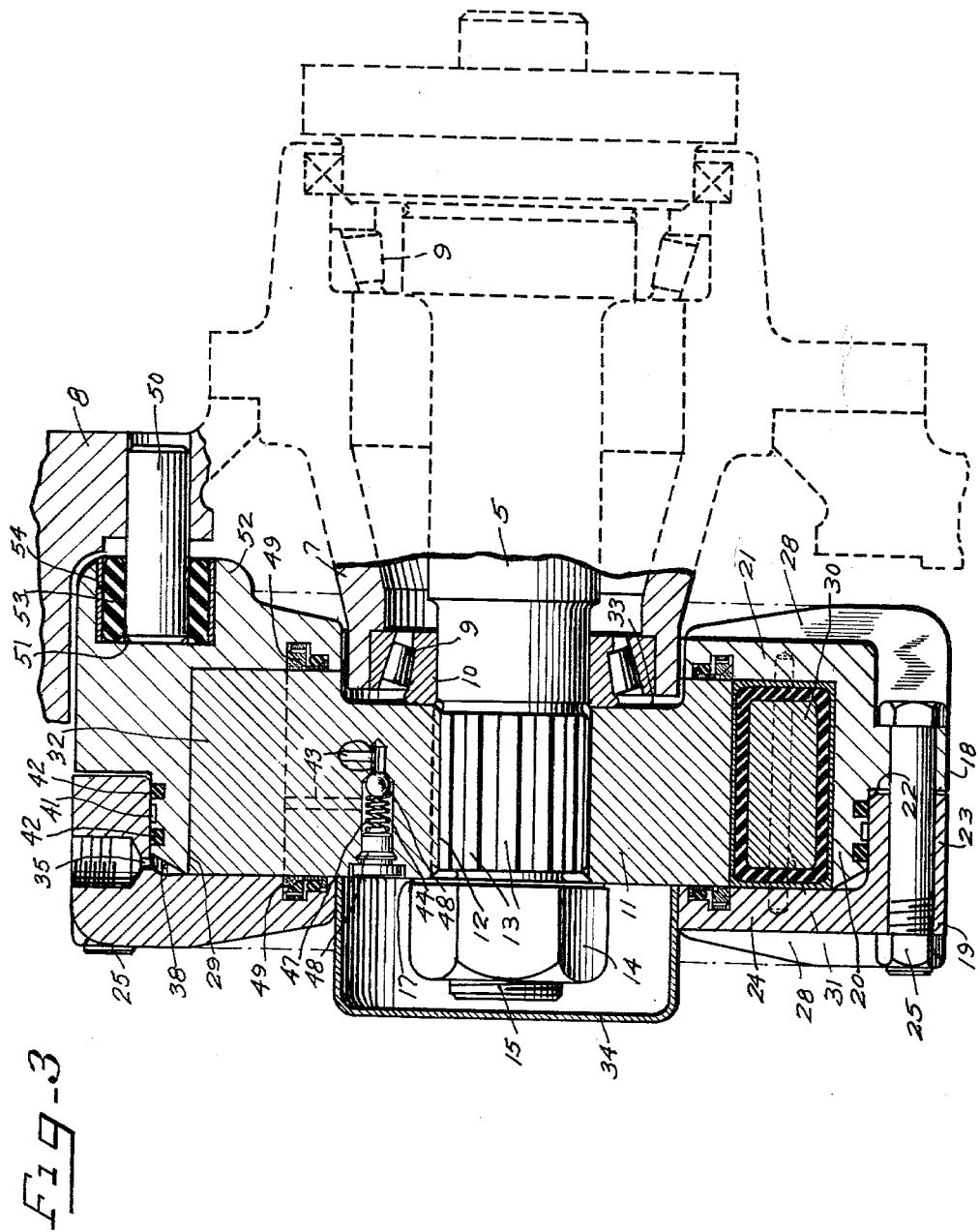

United States Patent Office 3,181,437
Patented May 4, 1965

3,181,437
ROTARY ACTUATOR
Rollin Douglas Rumsey and Gordon W. Kamman, Buffalo, N.Y., assignors to Houdaille Industries, Inc., Buffalo, N.Y., a corporation of Michigan
Filed Nov. 8, 1962, Ser. No. 236,218
12 Claims. (Cl. 92—122)

The present invention relates to rotary actuators and more particularly concerns improvements in hydraulic rotary actuators.

Because of their compactness, excellent power imput to work load ratios, generally trouble-free operation, durability and long life, and other desirable operational and functional characteristics, rotary hydraulic actuators are achieving increasing popularity where heavy duty oscillatory power is required.

Customarily, such actuators are rigidly secured to a supporting structure of the associated equipment so that the housing is held stationary with the supporting structure for attaining full rotary driving effect from the wing shaft of the actuator which is attached to the apparatus component to be driven thereby. However, in certain installations, such as in steering gear, a serious problem has been encountered due to permissive or wear-acquired movements of the shafting with which the actuator is operatively connected.

For instance, where the wing shaft member of the actuator is associated with a front end spindle or caster shaft on a tractor front end, misalignments and axial load must be taken into account. In such steering structures tapered bearings are commonly used and have a certain degree of flexibility under axial impact loads, the bearing expanding and permitting the shaft to move axially a limited distance, typically as much as 1/32 of an inch. Under these circumstances, it is necessary to provide a more or less universal joint or slip connection between the externally projecting wing shaft of a conventional rigidly mounted rotary actuator and the shafting structure to be motivated, otherwise the full thrust load of axial movement would be carried on the actuator vane structure ends, resulting in galling and scoring, with resulting impairment of function. However, due to limitations of space, cost factors, adaptability requirements, loose connection play factors, and the like, flexible connections between the wing shaft and driven shafting externally of the actuator are frequently undesirable and often impractical.

It is, accordingly, an important object of the present invention to provide a new and improved rotary actuator construction which will overcome the problems of misalignment and axial load in a novel manner.

A further object of the invention is to provide a new and improved hydraulic rotary actuator having a novel wing shaft structure accommodating substantial axial relative displacements of the actuator housing and wing shaft without any loose connections between the wing shaft and the component of equipment to be actuated.

Another object of the invention is to provide a new and improved rotary hydraulic actuator which will accommodate not only axial but also eccentric misalignments and loadings.

Still another object of the invention is to provide a new and improved floating mounting for rotary actuators.

A still further object of the invention is to provide a new and improved rotary actuator free from any bearing structure between the shaft and housing.

Yet another object of the invention is to provide a new and improved, highly efficient, compact, economical, rugged rotary hydraulic actuator construction.

Other objects, features and advantages of the present invention will be readily apparent from the following detailed description of an exemplary embodiment thereof taken in conjunction with the accompanying drawings, in which:

FIGURE 3 is a sectional elevational detail view taken substantially on the irregular section line III—III of FIGURE 1.

Figure 1:
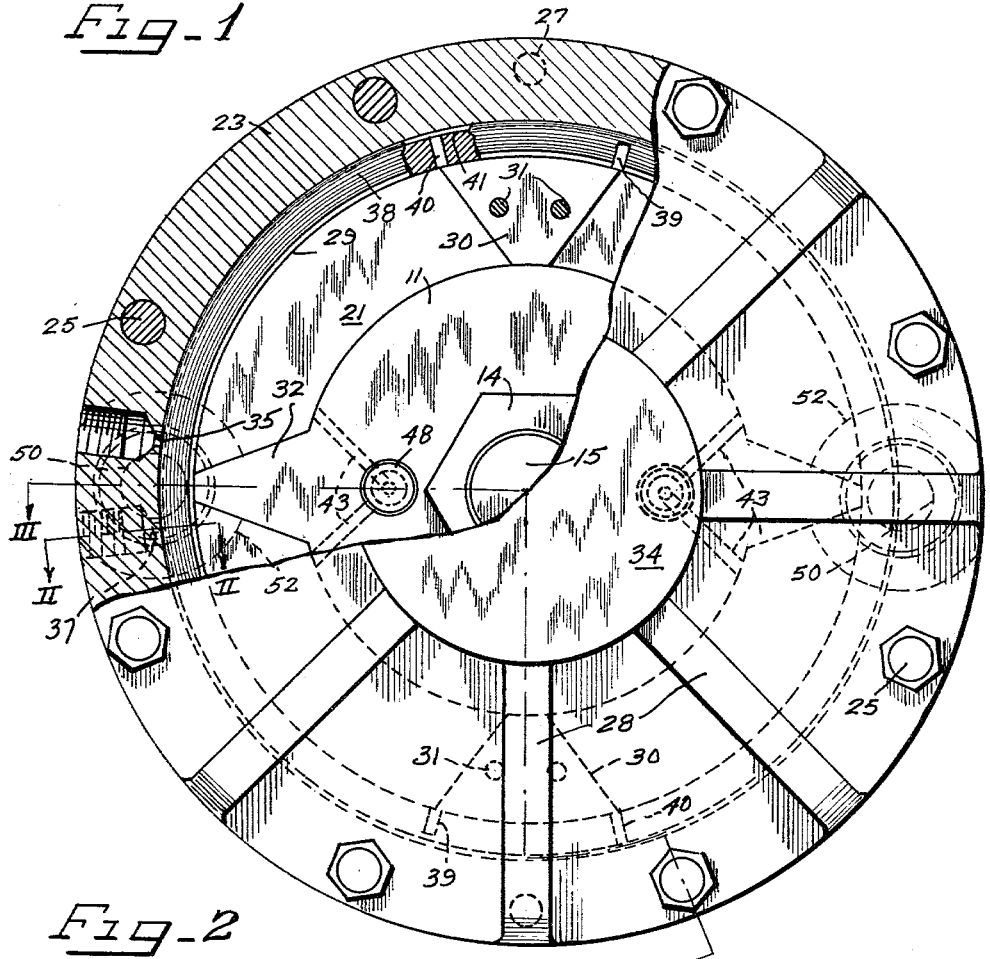
FIGURE 1 is a top or free end view of a hydraulic rotary actuator embodying features of the invention, with parts broken away and in section for illustrative purposes.
Figure 2:
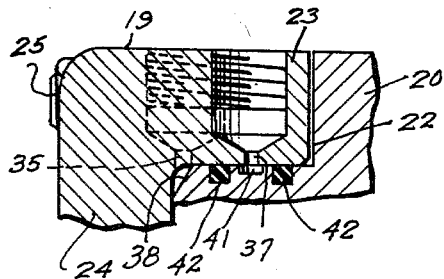
FIGURE 2 is an enlarged fragmentary sectional detail view taken substantially on the line II—II of FIGURE 1.

In the exemplary rotary hydraulic damper illustrated, the construction and arrangement are such as to adapt it especially for use in steering gear, and more particularly for association with a front end spindle or caster shaft 5 on a tractor front end. Such shaft is mounted in a hub structure 7 carried by supporting structure 8. Rotary mounting of the shaft 5 within the hub 7 is effected by means of respective spaced sets of tapered bearings 9, one of which sets is carried by a race including a ring element 10 having an outer end projecting beyond an adjacent terminal end of the hub 7 and engaging about an end portion of the shaft 5 projecting a substantial distance beyond such end of the hub and having mounted thereabout a wing shaft disk head or body 11.

Attachment of the wing shaft body 11 to the projecting end portion of the shaft 5 is effected by means of an axial splined bore 12 through the body member corotatively engaging with complementary splines 13 on the shaft portion enabling limited axial relative sliding displacement movement of the shaft and wing shaft body. This enables accommodation to the relative flexibility of the tapered roller bearings 9 which under axial impact loads tend to expand and allow the shaft to move axially, in a typical instance as much as 1/32 of an inch, which would result in imposition of corresponding axial load upon the wing shaft body 11 except for the corotational but relative axial sliding movement permitted by the connecting means afforded by the splines.

Normally, the wing shaft body 11 is secured at its inner margin in orientation with the splines 13 by means of a nut 14 secured on a threaded terminal end portion 15 of the shaft 5 and thrusting inwardly against the wing shaft body 11 through a washer 17 and maintaining the inner margin of the inner face of the wing shaft body 11 seated on the shoulder afforded about the gear shaft 5 by the projecting end portion of the bearing race 10.

An actuator housing is provided which engages only about an outer marginal portion of the wing shaft body 11 and is supported concentrically by the wing shaft body, but so related to the supporting structure 8 as to be held against rotation relative to the supporting structure. To this end, the wing shaft housing comprises a pair of complementary generally L-shaped housing sections 18 and 19, wherein the housing section 18 includes an axially extending annular body flange 20 and a radially inwardly extending mounting end face annular end flange 21. For concentric attachment of the housing sections 18 and 19, a rabbet 22 within the outer diameter of the end portion of the body part 20 concentrically receives an axially extending flange 23 on the housing section 19 which is also provided with a radial flange portion 24 opposing the housing flange 21. Means for securing the housing members 18 and 19 together in assembly with the wing shaft body 11 comprise a circumferentially spaced series of bolts 25 extending through the outer margins of the housing sections. For alignment purposes, suitable dowels 27 may also be provided between the opposing outer marginal portions of the housing sections. For reduction in material and weight, the end flange portions 21 and 24 are constructed as thin as practicable consistent with hydraulic pressure load resistance, and as permitted by reinforcement afforded by respective sets of radial reinforcing ribs 28 on their outer faces.

Within the housing provided by the two individually unitized housing member sections 18 and 19 is provided a hydraulic working chamber 29 the radially inner wall or boundary of which is defined by the outside diameter of the wing shaft body 11 and the outside perimeter or wall of which is defined by the cylindrical larger diameter inner wall surface of the housing body flange 20, while the housing flanges 21 and 24 on their inner faces provide end closures. Within the working chamber 29 suitable abutment and vane structure are provided comprising, in this instance, a pair of diametrically opposite abutments 30 suitably secured within the housing as by means of dowels 31 extending axially therethrough and anchored at their opposite ends in the housing flanges 21 and 24, in each instance. Oscillatably operative in the sub-chambers into which the working chamber 29 is divided by the abutments 30 is a pair of diametrically opposite actuating vanes 32 projecting from the wing shaft body 11. Operative sliding engagement of the inner nose portions of the abutments 30 with the cylindrical outer perimeter of the wing shaft body 11, and operative slidable engagement of the vanes 32 with the opposing cylindrical inner surface of the housing body 20 serves, at least in part, to maintain working concentricity of the wing shaft body 11 and the housing assembly although the housing end flanges 21 and 24 make only lapping engagement with the opposite radially outer marginal faces of the wing shaft body 11 and leave substantial inner marginal areas of both opposite faces of the wing shaft body 11 free.

Within the opening bore defined by the inner diameter of the housing end flange 21, clearance for free projection of the adjacent end of the hub 7 is afforded, and for additional compactness of construction, a complementary recess 33 in the adjacent rear or inner end of the wing shaft body 11 provides additional clearance for the hub end. Within the axial inner diameter bore of the end flange 24 clearance is provided for manipulative wrench engagement of the attachment nut 14, and for protective purposes a dust cap 34 is engaged within this bore, as shown.

Hydraulic pressure fluid for driving the wing shaft body 11 and through it the shaft 5 oscillatably is introduced into and exhausted from the working chamber 29 through respective ports 35 and 37 in the inner face of the housing flange 23 provided with the usual outwardly opening counterbore for attachment thereinto of a suitable connector by which communication is effected with respective ducts of a hydraulic fluid control system (not shown). In a convenient arrangement, the hydraulic fluid port 35 opens into the reentrant corner between the flanges 23 and 24 of the member 19 in communication with an annular distribution passage afforded by a chamfer 38 in the outer margin of the end of the body flange 20 which abuts the inside face of the end flange 24. Communication between this annular passage and the respective sub-chambers defined within the working chamber 29 by the abutments 30 is through respective radial communication grooves 39 formed in the end of the body flange 20 contiguous the respective abutments, substantially as shown in FIGURE 1. At the respective opposite sides of the abutments 30, communication of the sub-chambers of the working chamber with the fluid port 37 is effected through respective ports 40 extending through the flange 20 and communicating with an annular distribution passage channel 41 provided in the radially facing surface defining the rabbet 22. To prevent leakage from the joint between the flanges 20 and 23, as well as to prevent intercommunicating leakage between the distribution passages, suitable sealing rings 42 are accommodated in complementary grooves in the radially facing rabbet surface.

For one-way pressure relief purposes, in operation, the wing shaft body 11 has respective sets of cross-over passages 43 opening at their opposite ends at the respective opposite sides of the adjacent vane 32 and intercommunicating through a counterbored chamber 44 in the wing shaft body having a ball check valve 45 seated therein and biased by a spring 47 maintained under biasing compression by a plug 48.

To prevent leakage from the working chamber 29 past the interfaces of the wing shaft body 11 and the housing flanges 21 and 24, respective annular suitable sealing ring structures 49 are mounted in complementary annular recesses in the flanges and thrusting against the opposing faces of the wing shaft body.

Means coacting with the abutments 30 to maintain the actuator housing concentric with the wing shaft body 11, and also affording a substantially floating connection of the housing with the supporting structure 8 comprise mounting pins 50 of suitable diameter rigidly projecting from the mounting structure toward and into larger diameter sockets 51 provided therefor in hollow flange bosses 52 disposed at diametrically opposite portions of the end face of the housing member 18 at 90° intervals relative to the disposition of the abutments 30. A resilient, cushioning connection between the projecting portions of the pins 50 and the housing member 18 is effected by means of a resilient bushing 53 mounted on each of the pins 50 within a confining sleeve or ferrule 54 of a diameter to fit closely within the socket 51. Through this arrangement, the actuator housing is anchored resiliently against rotation relative to the supporting structure 8, is cushioned against bending stresses, is damped against vibrations and enabled to compensate for axial impact loads beyond the range of relative axial movement permitted by the splined interconnection of the shaft 5 and the wing shaft body 11. It will be observed that all parts of the actuator housing are adequately spaced from the supporting structure 8 and the hub 7 to permit the free floating mounting through the resilient bushings 53.

It will be understood that modifications and variations may be effected without departing from the scope of the novel concepts of the present invention.

We claim as our invention:
1. In a rotary actuator,
   a rotary actuating member constructed and arranged to be mounted in supported relation on a shaft to be actuated,
   a housing supported by said actuating member,
   and means for floatingly anchoring the housing in non-rotary relation to the actuating member.
2. In a rotary hydraulic actuator,
   a wing shaft disk body of generally cylindrical form having an axial face and vane means projecting radially from its periphery,
   a housing providing a hydraulic actuating chamber about the periphery of the wing shaft body and abutment means in the chamber coactive with the vane means for oscillation of the wing shaft body by hydraulic fluid in the working chamber,
   said wing shaft body having an axial bore therethrough for attachment to a shaft member to be rotatably actuated,
   the housing having a clearance opening for the shaft coaxial with and of substantially greater diameter than said bore with a radial flange portion of the housing opposing said face,
   and means for retaining the housing against rotation relative to the shaft.
3. In a rotary hydraulic actuator construction,
   a wing shaft disk body having a central bore for attachment of a shaft to be actuated,
   and a pair of complementary ring-shaped housing sections engaging the wing shaft body about and substantially spaced from said bore and defining about the perimeter of the wing shaft body a hydraulic working chamber, said housing sections supporting abutment means within the chamber, said wing shaft body having vane structure thereon in said working chamber, said abutment means and said vane structure coacting to maintain concentricity of the wing shaft member and the housing ring-shaped provided by said sections.

4. In a rotary hydraulic actuator construction, a wing shaft disk body having a central bore for attachment of a shaft to be actuated, a pair of complementary ring-shaped housing sections engaging the wing shaft body about and substantially spaced from said bore and defining about the perimeter of the wing shaft body a hydraulic working chamber, said housing sections supporting abutment means within the chamber, said wing shaft body having vane structure thereon in said working chamber, said abutment means and said vane structure coacting to maintain concentricity of the wing shaft member and the ring-shaped housing provided by said sections, and means externally of the housing cooperative with said abutment structure for maintaining the housing concentric with the wing shaft body when the vane structure approaches the abutment means in operation of the actuator.

5. In a rotary hydraulic actuator, a generally circular wing shaft body having diametrically opposite vanes, an annular housing supported by the wing shaft body and defining an annular working chamber about the perimeter of the wing shaft body and enclosing said vanes, diametrically opposite abutments rigid with the housing within said chamber and disposed respectively between said vanes, said abutments coacting with the perimeter of the wing shaft body for maintaining concentricity of the wing shaft body and the housing, and means located externally of the housing on a transverse axis normal to an axis through the abutments and coactive with the abutments in maintaing the concentricity, said means including sockets in the housing and pins projecting into the housing and having resilient bushings thereabout effecting connection between the pins and the housing within the sockets.

6. In apparatus including a rotatably mounted shaft having a projecting end portion and supporting structure for the shaft relative to which the shaft is rotatable, a rotary actuator including a rotatable actuating member attached corotatively to said projecting portion of the shaft, a housing supported by the actuating member, and means floatingly connecting the housing in non-rotary relation to said supporting structure.

7. In a rotary actuator for use with apparatus including relatively rotatably cooperating structures, the rotary actuator having relatively rotatably assembled wing shaft body and housing portions, means for connecting said body portion to one of said structures for automatic relative axial adjustment movements during operation, and means for substantially floatingly connecting said housing portion in non-rotary relation to the other of said structures.

8. A rotary fluid operated actuator comprising, a rotary body having axially opposite end faces, circumferentially spaced radially projecting vanes on the periphery of said body, said body having means for axially connecting the body to a shaft, a housing having means defining an annular working chamber about the periphery of said body and sealingly overlapping said end faces, and circumferentially spaced radially projecting abutments carried by the housing within said chamber between said vanes, said housing being entirely free from any engagement with any shaft connected to the body and said abutments and said vanes affording the sole radial bearing between said housing and said body.

9. A rotary fluid operated actuator comprising, a rotary body having axially opposite end faces, circumferentially spaced radially projecting vanes on the periphery of said body, said body having means for axially connecting the body to a shaft, a housing comprising a pair of ring-shaped housing members of generally L-shape complementary cross-section provided with telescopically overlapping axially oppositely extending outer marginal flanges defining a peripheral wall which together with the radially extending flanges of the housing members defines an annular working chamber about the periphery of said body and into which said vanes extend and slidably engage the inner side of said peripheral wall, said radially extending flanges overlapping said end faces and having sealing means therebetween, and circumferentially spaced radially projecting abutments fixed in said chamber between said vanes and slidably engaging said body periphery, said overlapping flanges defining therebetween circumferential fluid distribution grooves having ports to the outside of said wall for communication with fluid pressure source and having ported communication interiorly of the wall with working subchambers defined between said vanes and said abutments.

10. In apparatus including a supporting structure and a shaft rotatably mounted thereon on axially spaced tapered bearings mounted in ring race elements, said shaft having an end portion extending beyond one of said ring races and provided with a splined portion adjacent to the ring race and a threaded terminal portion, means for actuating said shaft rotatably comprising:

an actuator disk body having a central splined bore engaging on the splined portion of the shaft and having one end opposing said bearing race, said body having circumferentially spaced radially outwardly projecting vanes, a generally ring-shaped housing defining a radially inwardly opening annular working chamber within which the vanes are slidably engaged and having axially extending housing flanges overlapping the opposite ends of the body and having their inner edges substantially spaced from said bore and shaft to afford clearance openings exposing the inner margin of the body adjacent to the bore whereby on the face adjacent to said bearing race said race and its mount are accommodated within the clearance, abutments fixed within the housing in said chamber between said vanes, and means for introducing pressure fluid into said chambers between the vanes and abutments for rotating the body relative to the housing, a nut engaged on said threaded terminal portion of the shaft and retaining the body for limited axial relative movement of the shaft and body on the splined interconnection between said nut and said bearing race, said clearance within the inner edge of the housing flange adjacent to said nut affording room for working the nut with a wrench, and means for holding the housing against rotation.

11. In apparatus including a rotatable shaft, supporting structure rotatably mounting the shaft with a portion of the shaft projecting beyond the supporting structure,
a rotary actuator including a rotatable body secured on said shaft and a housing about said body,
means for driving the body rotatably relative to the housing to drive the shaft rotatably,
sockets in said housing opening toward said supporting structure,
pins rigid with the supporting structure and projecting into the sockets,
said pins being of smaller diameter than the sockets,
and resilient bushing means coupling the pins to the housing within said sockets and comprising the sole connection of the housing to the supporting structure.

12. In a rotary hydraulic actuator,
a generally circular wing shaft body having diametrically opposite vanes and axially opposite end faces,
an annular ring-shaped housing supported by the wing shaft body and defining an annular working chamber about the perimeter of the wing shaft body and enclosing said vanes with radial flanges of the housing engaging said end faces,
a shaft corotatively attached to said wing shaft body and said shaft protruding beyond one end of said housing,
diametrically opposite abutments rigid with the housing within said chamber and disposed respectively between said vanes,
said abutments coacting with the perimeter of the wing shaft body for maintaining concentricity of the wing shaft body and the housing,
and means connected to the housing and located externally on the housing on the same end as the protruding shaft and on a transverse axis normal to an axis through the abutments and coactive with the abutments in maintaining the concentricity,
said means including a supporting structure for the shaft relative to which the shaft rotates.

References Cited by the Examiner
UNITED STATES PATENTS

| | | | |
|---|---|---|---|
| 1,778,503 | 10/30 | Lord | 248—10 |
| 1,922,151 | 8/33 | Boice et al. | 64—23 |
| 2,070,413 | 2/37 | Sandberg | 121—97 |
| 2,194,374 | 3/40 | Wunsch | 92—118 |
| 2,292,536 | 8/42 | McCabe et al. | 248—10 |
| 2,342,610 | 2/44 | Elliott | 64—4 XR |
| 2,370,137 | 2/45 | Biggert | 121—97 |
| 2,511,501 | 6/50 | Floraday | 92—118 |
| 2,705,118 | 3/55 | Beck | 248—10 |
| 2,870,556 | 1/59 | Riddell | 121—97 |
| 2,994,446 | 8/61 | Van Auwelaer et al. | 121—97 |
| 3,053,236 | 9/62 | Self et al. | 92—122 XR |

FRED E. ENGELTHALER, *Primary Examiner.*

KARL J. ALBRECHT, *Examiner.*